(12) United States Patent
Brown et al.

(10) Patent No.: US 6,754,428 B1
(45) Date of Patent: Jun. 22, 2004

(54) FIBER ARRAY ALIGNMENT SUBSTRATE

(75) Inventors: Robert Brown, Boca Raton, FL (US); Jeffrey E. LeClaire, Boca Raton, FL (US); Huizong Lu, Coral Springs, FL (US); John L. Sullivan, Boca Raton, FL (US)

(73) Assignee: Zygo Corporation, Middlefield, CT (US)

( * ) Notice: Subject to any disclaimer, the term of this patent is extended or adjusted under 35 U.S.C. 154(b) by 49 days.

(21) Appl. No.: 10/098,750

(22) Filed: Mar. 14, 2002

Related U.S. Application Data

(60) Provisional application No. 60/340,915, filed on Oct. 30, 2001, provisional application No. 60/341,040, filed on Oct. 30, 2001, provisional application No. 60/275,864, filed on Mar. 14, 2001, and provisional application No. 60/275,863, filed on Mar. 14, 2001.

(51) Int. Cl.[7] ................................................. G02B 6/00
(52) U.S. Cl. .............................. 385/137; 385/65; 385/83
(58) Field of Search .............................. 385/137, 83, 65

(56) References Cited

U.S. PATENT DOCUMENTS

| | | | |
|---|---|---|---|
| 4,201,444 A | * | 5/1980 | McCartney et al. .......... 385/64 |
| 5,135,590 A | | 8/1992 | Basavanhally et al. |
| 5,178,723 A | * | 1/1993 | Nguyen ....................... 216/24 |
| 5,185,846 A | | 2/1993 | Basavanhally et al. |
| 5,218,663 A | * | 6/1993 | Isono et al. ................. 385/129 |
| 5,506,928 A | | 4/1996 | Evans et al. |
| 5,602,951 A | * | 2/1997 | Shiota et al. ................. 385/81 |
| 5,857,047 A | | 1/1999 | Strand et al. |
| 5,871,559 A | | 2/1999 | Bloom |
| 5,923,481 A | * | 7/1999 | Skidmore et al. ........... 359/819 |
| 5,926,594 A | | 7/1999 | Song et al. |
| 6,003,341 A | | 12/1999 | Bloom |
| 6,208,787 B1 | * | 3/2001 | Tam .......................... 385/120 |

FOREIGN PATENT DOCUMENTS

| | | |
|---|---|---|
| JP | 56077814 A2 | 6/1981 |
| JP | 63113508 A2 | 5/1988 |
| JP | 07056073 A2 | 3/1995 |
| JP | 09145947 A2 | 6/1997 |

\* cited by examiner

*Primary Examiner*—Hae Moon Hyeon
(74) *Attorney, Agent, or Firm*—Fish & Richardson P.C.

(57) ABSTRACT

An apparatus includes a substrate having at least one opening through a top surface to a bottom surface, the substrate also having a first plurality of aligned grooves formed in the top surface and a plurality of fibers, where each of the plurality of fibers are positioned over the opening and in contact with the substrate within a corresponding one of the first plurality of grooves. In another aspect, a method of manipulating fibers includes placing a plurality of fibers on a substrate to extend over an opening formed through a top surface of the substrate to a bottom surface of the substrate, and flowing air through the opening to draw the plurality of fibers down towards the top surface of the substrate, and positioning each of said plurality of fibers in substantial alignment.

8 Claims, 3 Drawing Sheets

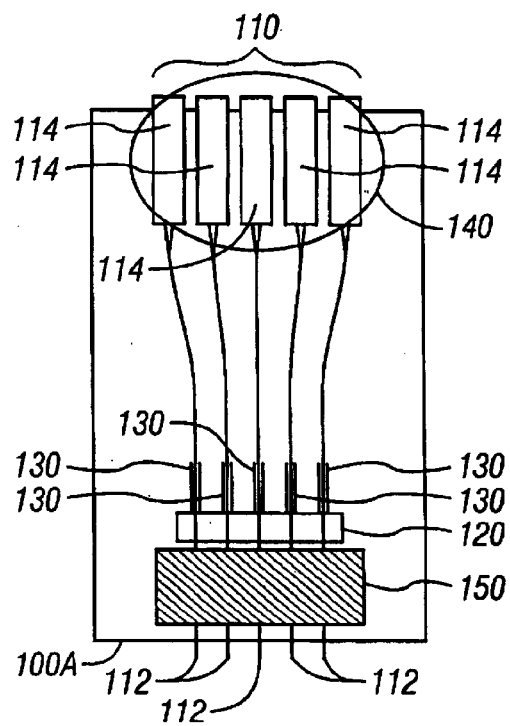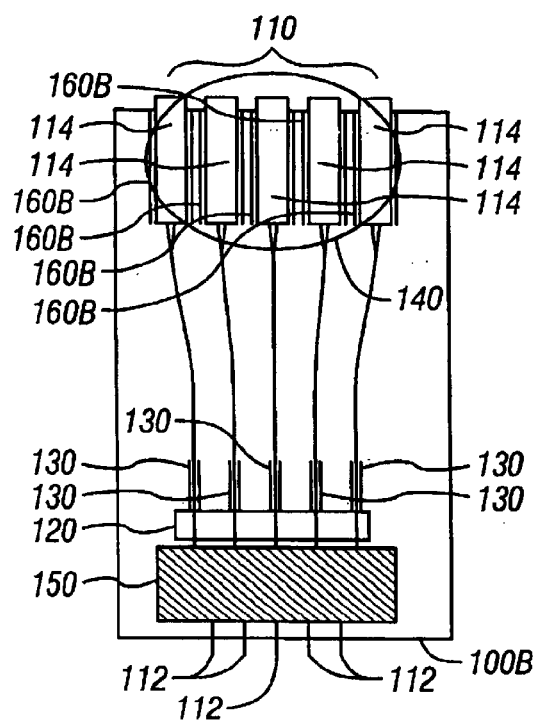
FIG. 1A          FIG. 1B
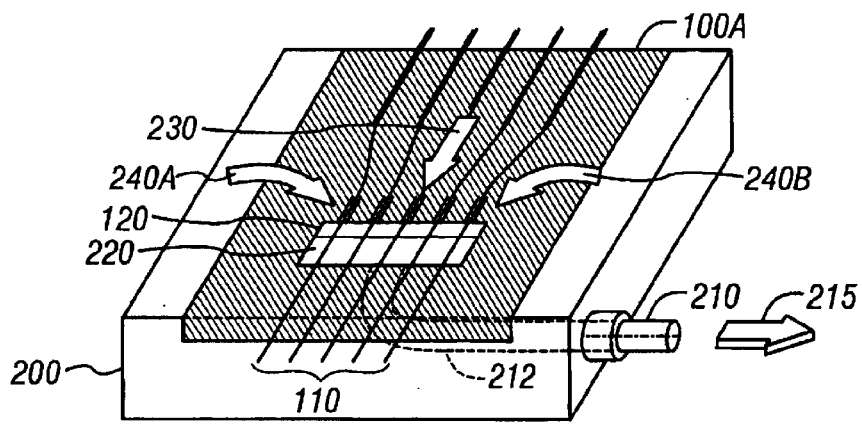
FIG. 2

FIBER ARRAY ALIGNMENT SUBSTRATE

CLAIM OF PRIORITY

This application claims priority under 35 USC §119(e) to U.S. patent application Ser. No. 60/275,864, filed on Mar. 14, 2001, the entire contents of which are hereby incorporated by reference.

This application also claims priority under 35 USC §119 (e) to U.S. patent application Ser. No. 60/275,863, filed on Mar. 14, 2001, the entire contents of which are hereby incorporated by reference.

This application also claims priority under 35 USC §119 (e) to U.S. patent application Ser. No. 60/341,040, filed on Oct. 30, 2001, the entire contents of which are hereby incorporated by reference.

This application also claims priority under 35 USC §119 (e) to U.S. patent application Ser. No. 60/340,915, filed on Oct. 30, 2001, the entire contents of which are hereby incorporated by reference.

TECHNICAL FIELD

This invention relates to manipulating and aligning fibers on a substrate.

BACKGROUND

It is often desirable to align multiple fibers into an array of parallel fibers. One method of accomplishing this is to place fibers into parallel grooves that have been formed in the surface of a substrate. Typically, the placement of the fibers into the grooves is performed manually and requires careful and precise operations by skilled operators. In some cases, it is desirable to align multiple "etched" fibers, i.e., fibers that have been stripped of their outer protective coatings and then etched to reduce the outer diameter of the fiber.

SUMMARY

According to an aspect of this invention, an apparatus includes a substrate having at least one opening through a top surface to a bottom surface, the substrate having a first plurality of aligned grooves formed in the top surface, and a plurality of fibers, wherein each of the plurality of fibers are positioned over the opening and in contact with the substrate within a corresponding one of the first plurality of grooves.

One or more of the following features may also be included: wherein the opening is horizontally longer in a first dimension than a second dimension relative to the top surface of the substrate, and wherein the first plurality of aligned grooves is formed substantially perpendicular to a side of the opening of the first dimension. Wherein the side of the first dimension is as least as wide as the combined diameters of the plurality of fibers. Wherein each of the plurality of fibers has a smaller diameter section held within one of the first plurality of grooves and wherein each of the plurality of fibers has a larger diameter section in contact with the substrate in an area spaced from the first plurality of grooves. Wherein the larger diameter sections of the fibers are placed in contact with each other in a plurality of rows. Wherein the substrate has a second plurality of grooves formed in the top surface that are spaced from the first plurality of grooves, and wherein the second plurality of grooves are substantially aligned with the first plurality of grooves. Wherein each of the plurality of fibers has a smaller diameter section held within one of the first plurality of grooves and a larger diameter section held within one of the second plurality of grooves. Wherein the second plurality of grooves are spaced further apart from each other than the first plurality of grooves. The apparatus may further include a bonding material holding the plurality of fibers to the substrate. The apparatus may further include a holding cap contacting the bonding material.

According to a further aspect of this invention an apparatus includes a substrate, the substrate having an opening through a top surface to a bottom surface, a plurality of fibers contacting the substrate substantially in parallel across the opening, wherein the sections of the plurality of fibers in contact with the substrate are substantially equal in diameter, wherein the opening facilitates a flow of air, and a bonding material holding the plurality of fibers to the substrate.

One or more of the following features may also be included: Wherein the opening is horizontally longer in a first dimension than a second dimension relative to the top surface of the substrate, and wherein the plurality of fibers are substantially perpendicular to a side of the opening of the first dimension. The apparatus may further include a holding cap contacting the bonding material.

According to a further aspect of this invention an apparatus includes a substrate, the substrate having a groove formed in a top surface and recess formed in a bottom surface, wherein the recess intersects with a lower portion of the groove and forms an opening in the lower portion of the groove, and wherein the opening facilitates a flow of air, a fiber, the fiber positioned within the groove, and a bonding material holding the fiber in the groove.

One or more of the following features may also be included: A plurality of fibers, wherein the substrate has a plurality of grooves formed in the top surface, wherein the recess intersects with a lower portion of at least one of the plurality of grooves and forms at least one opening in the lower portion of one of the plurality of grooves, and wherein each of the plurality of fibers are positioned within a corresponding one of the plurality of grooves, and a bonding material holding the plurality of fibers in the plurality of grooves.

According to a further aspect of this invention a method of manipulating fibers, the method includes placing a plurality of fibers on a substrate to extend over an opening formed through a top surface of the substrate to a bottom surface of the substrate, and flowing air through the opening to draw the plurality of fibers down towards the top surface of the substrate, and positioning each of the plurality of fibers in substantial alignment.

One or more of the following features may also be included: Wherein the opening is horizontally longer in a first dimension than a second dimension relative to the top surface of the substrate, and wherein the placing includes placing the plurality of fibers approximately perpendicular to a side of the opening of the first dimension. Wherein the positioning further includes positioning one of the plurality of fibers within a corresponding one of a plurality of grooves formed in the top surface of the substrate proximate to the opening.

According to a further aspect of this invention a method of providing an airflow opening in a substrate, the method includes forming a groove in a top surface of a substrate, and forming a recess in a bottom surface of the substrate, wherein the recess intersects a lower portion of the groove, and wherein the intersection between the recess and the groove forms an opening in a lower portion of the groove and facilitates a flow of air through the opening.

One or more of the following features may also be included: Wherein forming a groove further includes forming a plurality of grooves in the top surface of the substrate, wherein the recess intersects with a lower portion of at least one of the plurality of grooves.

Embodiments of the invention may have one or more of the following advantages. For example, they enable an operator to quickly and easily align a set of fibers on a substrate using the forces associated with a flow of air. They also enable an operator to align fibers with a minimal amount of handling which reduces the possibility of damage to individual fibers. Moreover, by using the apparatus and methods of the invention, the forces associated with a flow of air can be used to hold a set of fibers against a substrate, after the fibers are aligned, and allow an application of bonding material to all of the fibers simultaneously, that is, without requiring tacking or bonding of individual fibers as they are placed. Furthermore, some of the embodiments allow for an alignment of a set of etched fibers into a "fan-out" pattern, i.e., placing a set of etched fiber ends within a set of closely-spaced grooves formed in a substrate, and positioning the larger diameter sections of the same set of fibers into a more widely-spaced pattern in an area away from the grooves.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A shows a first embodiment of a fiber alignment substrate having an airflow slot and one set of grooves;

FIG. 1B shows a second embodiment of a fiber alignment substrate having an airflow slot and two sets of grooves;

FIG. 2 shows the substrate of FIG. 1A mounted on an airflow fixture;

DETAILED DESCRIPTION

Figure 3:
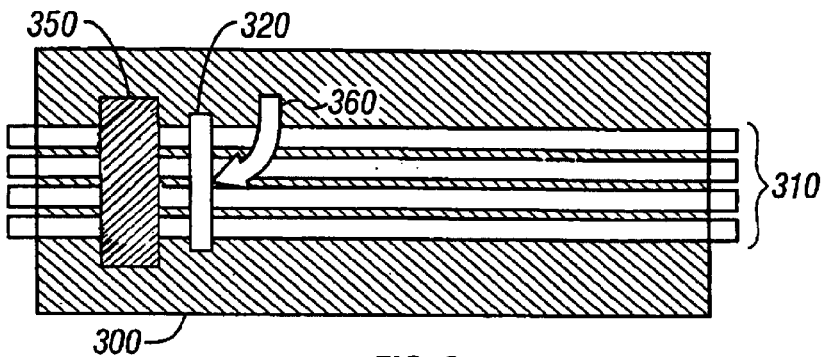
FIG. 3 shows a third embodiment of a fiber alignment substrate having an airflow slot but without grooves.

A set of fibers is aligned on a substrate by placing the fibers across an opening in the substrate and applying an airflow through the opening. A pressure differential created by the airflow causes the fibers to be pulled down onto the substrate. The forces associated with the airflow through the opening enables an operator to adjust the position of the fibers while the airflow holds the repositioned fibers in place. The airflow is continued until a bonding material and a holding cap is applied over the aligned fibers, at which point the airflow is turned off or reduced.

Referring to FIGS. 1A and 2, a substrate 100A includes a set of closely-spaced grooves 130 formed next to an airflow opening 120 and a fan-out area 140 spaced away from opening 120. An airflow fixture 200 includes an airflow opening 220 formed through the top surface of fixture 200. Airflow opening 220 aligns with airflow opening 120 when substrate 100A is placed onto the top surface of fixture 200. Fixture 200 also includes a hollow airflow connector 210 attached to a side surface of fixture 200 and an airflow channel 212, formed within fixture 200 and airflow opening 220 to airflow connector 210. In use, an operator places substrate 100A onto the top surface of fixture 200 and then places a set of etched fibers 110 across opening 120 and substrate 100A. A vacuum source (an "airflow source"-not shown) is connected to airflow connector 210 to create a downward airflow 230, through airflow opening 220 and opening 120, and an outward airflow 215 from fixture 200. Downward airflow 230 creates a differential pressure that pulls fibers 110 down onto the top of substrate 100A, i.e., downward airflow 230 from the top of substrate 100A causes fibers 110 to experience a higher pressure above opening 220 and 120 and a lower pressure below.

If required, the final placement of fibers 110 into grooves 130 is performed manually, by an operator who manipulates fibers 110 with a small instrument, such as a small pick or brush (not shown) while downward airflow 230 is continued. Each of the individual fibers in set 110 has smaller-diameter etched ends 112 and larger-diameter non-etched sections 114. In use, the operator nudges or brushes the fibers on or near the substrate 100A. The forces applied by the operator are sufficient to temporarily overcome the airflow forces produced by the airflow through opening 120. By temporarily overcoming the airflow forces and nudging or brushing the fibers, the operator is able to reposition the etched ends 112 of individual fibers 110 into grooves 130, while the continued downward airflow 230 causes a downward force to pull fibers 110 toward the substrate and into grooves 130. Sideward airflow forces 240A and 240B are also applied to the set of fibers 110, as a result of the design of the airflow opening 120 and the nature of the flow of air around the opening. Sideward airflows 240A and 240B cause inward forces to be applied to the fibers 110, i.e., causing the application of forces in the same horizontal plane as the top surface of substrate 100A but perpendicular to the longitudinal axis of the fibers 110 causing the set of fibers 110 to be pushed toward each other. The sideward airflow forces are controlled by the strength (amount) of airflow applied to airflow connector 210 and by the length of channel 120. The airflow source is left on to hold etched ends 112 of fibers 110 in grooves 130 while the operator positions non-etched sections 114 of fibers 110 into a more widely-spaced row in fan-out area 140. The airflow is continued after the fibers 110 are positioned and the operator applies a bonding material (not shown), e.g epoxy or glue, to fibers 110 and substrate 110A, and then positions a holding cap 150 over and onto the bonding material, at which point the airflow may be turned off or reduced. Holding cap 150 may include a set of grooves formed in the surface contacting fibers 160 that match the alignment pattern of fibers 160.

Referring to FIG. 1B, a second embodiment of a fiber alignment substrate 100B includes all of features of substrate 100A, and also includes a second set of grooves 160B formed in the top surface of substrate 100B in the fan-out area 140 for holding the non-etched sections 114 of etched fibers 110 in alignment. Grooves 160B are more widely-spaced than grooves 130 and are formed to an appropriate depth to hold non-etched sections 114 of fibers 110. The placement of etched fibers 110 on substrate 100B is similar to that described before in connection with substrate 100A, i.e., in use, substrate 100B is placed on airflow fixture 200, and a flow of air through opening 120 enables an operator to position the etched fiber ends 112 within grooves 130 and then position the non-etched sections 114 of fibers 110 within more widely-spaced grooves 160B.

In the embodiments discussed above the etched fibers 110 were placed on a substrate 100A or 100B in a "fan-out"

pattern, i.e., a closely-spaced pattern at the etched ends 112 and a more widely-spaced pattern at the non-etched sections 114 of fibers 110. When placing fibers that have varying outer diameters, or, when placing fiber with varying separation distances across a single substrate, the use of grooves formed in the substrate surface with accurate center-to-center distances between them is necessary to ensure accurate center-to-center distances between the fibers. In contrast, when aligning fibers together that have approximately equal outer diameters, the center-to-center distance between the fibers may be established, in part, by the outer diameter of the fibers and without using grooves.

Referring to FIG. 3, when aligning a set of fibers 310 that have approximately equal outer diameters, a fiber alignment substrate 300 includes a top surface that is flat (i.e., without grooves formed in the surface). Substrate 300 includes an airflow opening 320, and, in use, substrate 300 is placed on airflow fixture 200 and a downward airflow 360 is passed through opening 320, that enables an operator to align fibers 310 on substrate 300. Downward airflow 360 causes fibers 310 to be held down on the top surface of substrate 300 while the operator applies a bonding material (not shown) and then a holding cap 350 over and onto the bonding material. Holding cap 350 may include a set of grooves formed in the surface contacting fibers 310 that match the alignment pattern of fibers 310.

In the embodiments discussed above, the shape of the airflow openings 120 and 320 in the top surface of substrate 100A, 100B and 300, respectively, are rectangular relative to the top surface of each substrate, with the longest sides of openings 120 and 320 being roughly perpendicular to the longitudinal axis of the grooves and the fibers being placed. The length of the longer-sides of openings 120 and 320 is slightly longer than the combined width of the diameters of the set of fibers being placed when all of the fibers in the set are placed side-by-side. This longer-side length can be increased to increase the access to manipulate the fibers from the side of or below the set of fibers.

Figure 4A:
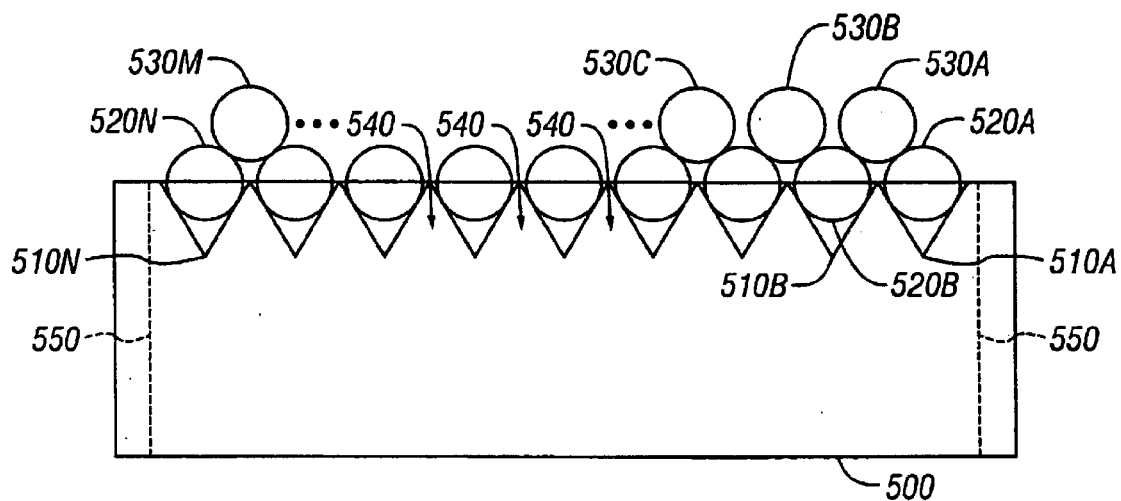
FIGS. 4A–4B shows a stacked set of fibers on a substrate.
Figure 4B:
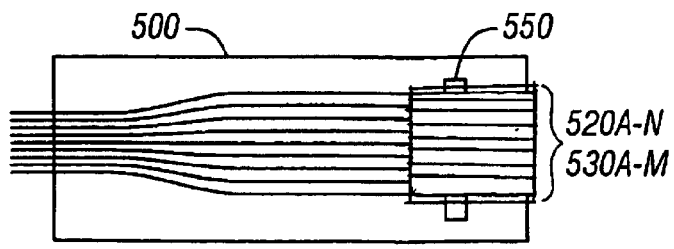

As described before in connection with substrate 100A and 100B, the placement of etched fibers on a substrate may result in a "fan-out" pattern, i.e., where the etched ends are placed in a more closely-spaced pattern and the non-etched sections are placed in a more widely spaced single row that is spaced away from the etched ends. Referring to FIG. 4A and 4B, an alternative pattern is shown for positioning the larger-diameter section of a set of etched fibers 520A–520N and 530A–530M on a substrate 500, i.e. placing the non-etched section of fibers 520A–520N and 530A–530M in multiple rows with a first row of fibers 520A–520N placed into a set of grooves 510A–510N formed on a substrate 500 and a second row of fibers 530A–530M placed above the first row 520A–520N. More specifically, the second row of fibers 530A–530M is placed between the grooves formed between the pairs of fibers of the first row of fibers 520A–520N. An airflow 540 is applied next to the fibers through an airflow slot 550 to create a pressure differential above and below fibers 520A–520N and 530A–530N during placement and to hold the fibers in place until bonded together and to substrate 500. The placement pattern shown in FIGS. 4A and 4B reduces the required width of the substrate 500 for a given number of fibers being placed.

Figure 5A:
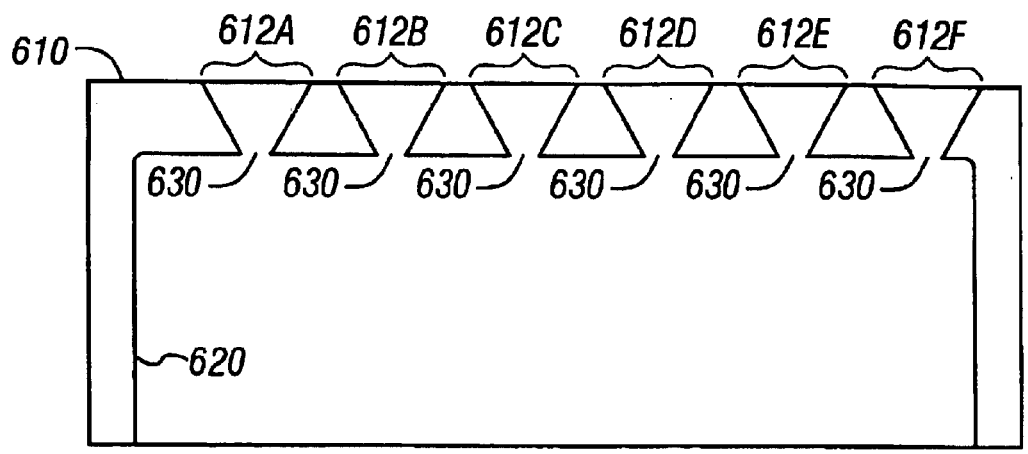
FIG. 5A shows a grooved substrate with airflow slots.
Figure 5B:
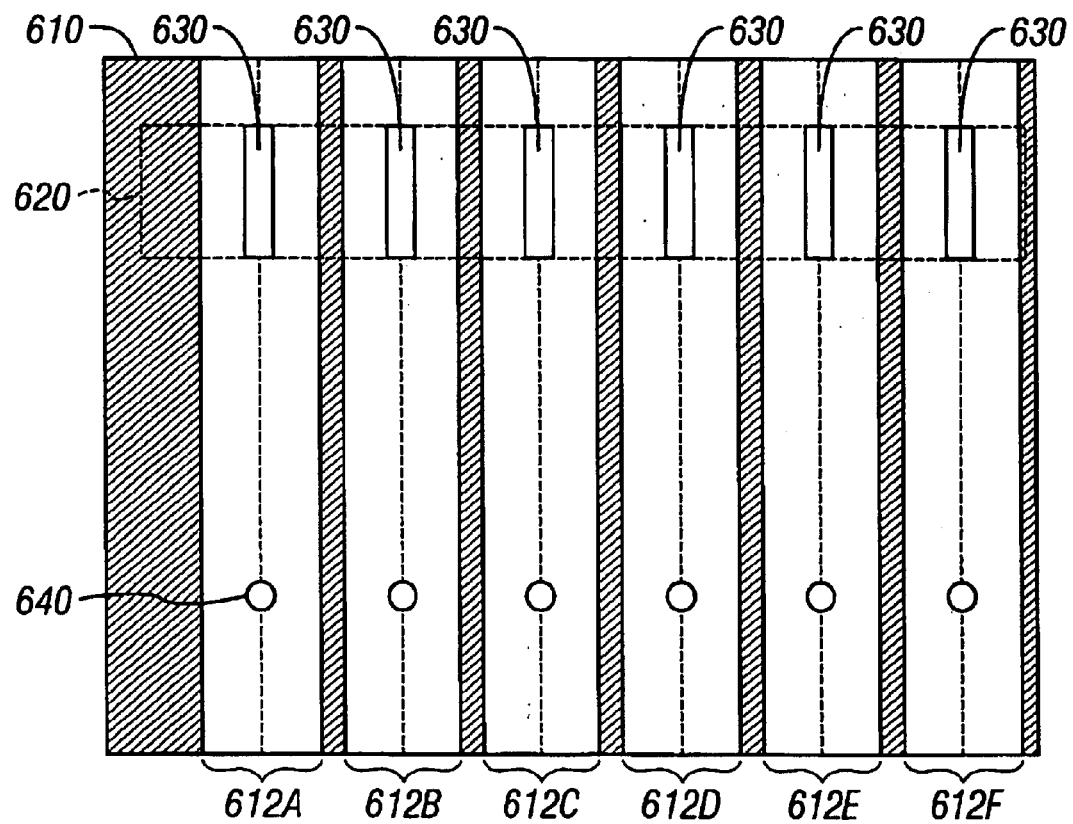
FIG. 5B shows the grooved substrate of FIG. 5A with airflow slots and airflow holes.

Referring to FIGS. 5A and 5B, another way of creating airflow openings through a grooved substrate is to drill or form holes 640 in the lower portion of a set of grooves 612A–612F formed in a top surface of substrate 610. An airflow from the top surface of substrate 610 and into holes 640 causes a pressure differential above and below the holes 640 which may be used to manipulate and hold fibers within the grooves 612A–612F. However, aligning smaller-diameter etched fibers as closely as possible requires grooves that are more closely spaced and shallower than the grooves required when aligning full-diameter fibers. More specifically, in one application, the etched fibers ends may be on the order of 50 um in diameter and require a set of grooves each of which are approximately 50 um wide and 50 um in depth. To avoid removing too much material from these closely-spaced grooves when forming or drilling holes 640, the maximum diameter of the hole is limited. Therefore, the fabrication of the holes is difficult and requires a large number of holes to achieve the desired airflow through the grooves. An alternative way of creating airflow openings through a grooved substrate 610 is to create (for example, by an etching process) a recess 620 in the back of substrate 610 that intersects with the lower portion of grooves 612A–612F, thereby creating openings 630 in the lower portion of grooves 612A–612F. By forming recess 620 to a known depth into the back of substrate 610, openings 630 are created that allow the desired airflow but without causing the removal of an excessive amount of material from grooves 612A–612F.

A problem with some bonding materials and methods is that voids may be created and may remain in the cured bonding material, e.g., air bubbles. Typically, following bonding and curing, the substrate and fiber ends are 'lapped back' to a desired length and/or angle. The lap back procedure uses a grinding material to grind off and polish the fiber ends and the substrate, and, therefore it exposes voids in the bonding materials. Lapping back a fiber that is near a void in the bonding material may cause the fiber to shift and/or be damaged. To address the problem of voids in the bonding material, in an embodiment, the airflow is left on during the application of the bonding material and the holding cap or holding substrate. The differential pressures created by the airflow cause the bonding material to be drawn into the grooves and along the fibers to even out the application and reduce the number of voids between the fibers, the holding cap or holding substrate.

Though we have described specific embodiments, we do not intend to imply there are not other ways to implement some of the features of those embodiments. For example, we mentioned epoxy or glue as the means by which various elements are attached to each other. However, any appropriate method which affixes one element to another could be used, such as fusing or soldering. If the bonding material requires thermal curing, the fiber alignment substrate and/or the airflow fixture may be placed in an oven to speed the curing. The holding cap may be larger or smaller than shown in the attached figures and may contact not only the aligned fibers held within grooves but may also contact the non-etched fiber sections placed in the fan-out areas. Also, although a single rectangular slot placed directly behind grooves in the substrate was described, any number of through holes of various shapes, sizes and locations could also be used to hold the fibers against the substrate and to orient the fibers relative to one another. In addition, other hole shapes, sizes and locations may be used to aid in the application of bonding material. Also, instead of having an operator manipulate the fibers to position them, an automated mechanical arm with a tool of the appropriate size could be used to manipulate the fibers, for example, from either the side of the fibers or through the airflow opening below the substrate, to raise, and position the fibers. The vacuum source described previously may be implemented as a vacuum pump or as a "Bernoulli effect" vacuum generator, for example.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:

a substrate having at least one opening through a top surface to a bottom surface, said substrate having a first plurality of aligned grooves formed in the top surface; and a plurality of fibers, wherein each of said plurality of fibers are positioned over the opening and in contact with said substrate within a corresponding one of the first plurality of grooves, wherein the opening is horizontally longer in a first dimension than a second dimension relative to the top surface of said substrate, and wherein the first plurality of aligned grooves is formed substantially perpendicular to a side of the opening of the first dimension, and wherein each of said plurality of fibers has a smaller diameter section held within one of the first plurality of grooves and wherein each of said plurality of fibers has a larger diameter section in contact with the substrate in an area spaced from the first plurality of grooves.

2. The apparatus of claim 1 wherein the side of the first dimension is as least as wide as the combined diameters of said plurality of fibers.

3. The apparatus of claim 1 wherein the larger diameter sections of said fibers are placed in contact with each other in a plurality of rows.

4. The apparatus of claim 1, wherein said substrate has a second plurality of grooves formed in the top surface that are spaced from the first plurality of grooves, and wherein the second plurality of grooves are substantially aligned with the first plurality of grooves.

5. The apparatus of claim 4, wherein each of said plurality of fibers has a smaller diameter section held within one of the first plurality of grooves and a larger diameter section held within one of the second plurality of grooves.

6. The apparatus of claim 5, wherein the second plurality of grooves are spaced further apart from each other than the first plurality of grooves.

7. The apparatus of claim 1 further comprising:

a bonding material holding said plurality of fibers to said substrate.

8. The apparatus of claim 7 further comprising:

a holding cap contacting said bonding material.

* * * * *